United States Patent [19]

Bernard

[11] Patent Number: 4,479,614

[45] Date of Patent: Oct. 30, 1984

[54] VARIABLE SPEED MEAT GRINDER

[76] Inventor: Vincent E. Bernard, 23301 Bocana, Malibu, Calif. 90265

[21] Appl. No.: 484,903

[22] Filed: Apr. 14, 1983

[51] Int. Cl.³ .............................................. B02C 18/30
[52] U.S. Cl. .................................. 241/82.2; 241/82.5
[58] Field of Search ...................... 17/35–39; 241/82.1–82.7

[56] References Cited

U.S. PATENT DOCUMENTS

| | | |
|---|---|---|
| 3,723 | 8/1844 | Clark . |
| 1,036,870 | 8/1912 | Masson . |
| 1,596,205 | 8/1926 | Masson . |
| 1,611,244 | 12/1926 | Schmidt .......................... 241/82.5 X |
| 1,915,135 | 6/1933 | Schmidt . |
| 2,796,104 | 6/1957 | Klod ................................. 241/82.5 |
| 2,865,417 | 12/1958 | Waters . |
| 3,450,179 | 6/1969 | Golding ............................. 241/82.5 |
| 3,525,374 | 8/1970 | Fitch et al. . |
| 4,018,390 | 4/1977 | Funakubo .......................... 241/82.5 |

Primary Examiner—Mark Rosenbaum
Attorney, Agent, or Firm—Jerry W. Mills; Gregory M. Howison; Nina Medlock

[57] ABSTRACT

A meat grinder includes a pump (12) that feeds meat particles into a mixing chamber (32) at a constant flow rate. The meat exits into a frusto-conical shaped collection chamber (36) for passage to a grinder plate (38). A rotating knife (40) with radially extending blades (50) is rotated by a hydraulic motor (42) at a variable rate. The variable flow rate of the particles to chamber (36) and the variable speed of the knife (40) results in a variable particle size output by the grinder plate (38).

3 Claims, 1 Drawing Figure

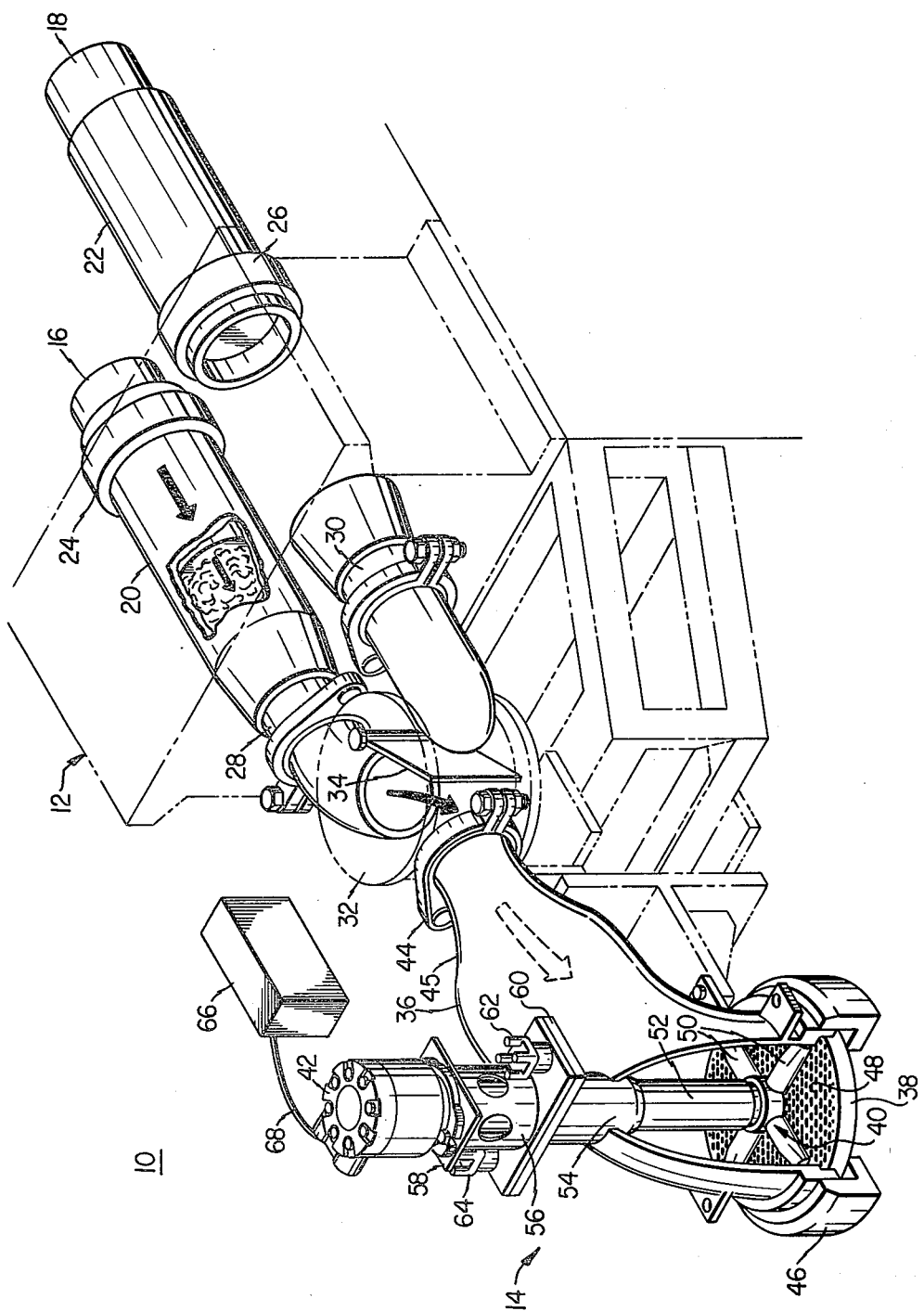

VARIABLE SPEED MEAT GRINDER

TECHNICAL FIELD

The present invention pertains in general to meat grinders and, more particularly, to a meat that has a variable grinding speed with a constant flow of meat.

BACKGROUND OF THE INVENTION

Conventional meat grinders in the past have utilized a screw type conveyor for advancing meat particles through a chamber to force them through a grinder plate which is disposed at the end of the chamber. The grinder plate normally has a plurality of orifices disposed therethrough for reducing the particulate size of the meat. Normally, grinding is begun with baseball size chunks of meat and then reduced to a desired size which may take several stages of grinding.

Screw type meat grinders require a defined clearance between the screw conveyor and the sides of the chamber through which the meat is passed. This clearance allows the screw conveyor to clear the walls while rotating. However, this clearance allows meat to flow backwards around the screw conveyor under high pressure conditions, thereby reducing the maximum amount of pressure that can be applied to the meat particles at the grinder plate. This pressure limit defines the maximum flow rate of meat that can be passed through a grinder plate. In addition, gristle or bone chips that may be present in the meat may clog the grinder plate and further inhibit grinding.

In grinding the meat to a desired particle size in a large manufacturing environment, it has been necessary to change grinder plates at various stages of the operation. Since it is very difficult to go from a large particulate size to a very small particulate size, a number of stages are necessary. When the meat is output from the grinder plate, it takes on a very "stringy" texture since the fat and meat fibers have a tendency to adhere together along the longitudinal direction. Therefore, the grinding operation requires an additional step to reduce the length of this material. All of these operations must be repeated for each stage of grinding.

These problems have been addressed in U.S. Pat. No. 1,611,244 issued to Schmidt on Dec. 21, 1926. Schmidt discloses a grinder that utilizes a piston to advance the meat in the chamber towards the grinder plate. A rotating grinder knife is supplied adjacent the grinder plate to rotate thereabout. An electric motor is provided to rotate the knife through a shaft. To place meat into the chamber, the grinder plate must be removed and then replaced.

In view of the above disadvantages, there exists a need for a meat grinder that supplies a continuous flow of meat at a high pressure with a variable particulate size output.

SUMMARY OF THE INVENTION

The present invention disclosed and claimed herein comprises an apparatus for grinding meat. The meat grinder includes a pump for pumping meat particles in a continuous flow under high pressure. This meat is pumped into the inlet port of a collection chamber that has a frusto-conical shape with the outlet port having a larger diameter. A grinder plate is disposed at the outlet port of the collection chamber with a plurality of holes disposed therein for reducing the diameter of the particulate size of the meat as the meat is pressed therethrough. A cutting knife is disposed adjacent the grinder plate for reducing the length of the particulate matter output from the grinder plate. A variable motor is attached to the cutting knife for moving the cutting knife perpendicular to the surfaces in the grinder plate. The variable motor has a variable speed such that the length of the particulate matter output from the grinder plate is varied depending upon the particular application.

In accordance with another embodiment of the present invention, the variable motor is a hydraulic motor with an external pump for providing the hydraulic pressure thereto. This hydraulic motor has a continuously variable speed to rotate the cutting knife at a variable rotation speed. By varying the rotation speed of the knife, the length of the particulate size pressed through the grinder plate can be determined for a desired particulate size.

BRIEF DESCRIPTION OF THE DRAWING

For a more complete understanding of the present invention and the advantages thereof, reference is now made to the following description taken in conjunction with the accompanying Drawing which illustrates a perspective view of the meat grinder of the present invention.

DETAILED DESCRIPTION OF THE INVENTION

Referring now to the Drawing, there is illustrated a perspective view of a variable speed meat grinder 10. Meat grinder 10 is comprised of a continuous flow pump 12 that supplies a continuous flow of meat particles at a pressure of up to 3,000 pounds per square inch (psi). One type of pump utilized to provide the continuous flow of meat products is manufactured by Marlen Research Corporation in Overland Park, Kansas. The pump 12 has its output attached to a grinder 14 for reducing the size of the particulate matter passed therethrough.

The pump 12 is comprised of two pistons 16 and 18 that are alternately reciprocal within movable sleeves 20 and 22, respectively. Sleeves 20 and 22 are slideable within guide rings 24 and 26, respectively. The pistons 16 and 18 and the sleeves 20 and 22 reciprocate within a feeding chamber (not shown) which has the particulate matter fed thereto. As the sleeve 20 and the sleeve 22 reciprocate forward into the feeding chamber, they connect with output tubes 28 and 30, respectively. The output tubes 28 and 30 are fed to a mixing chamber 32 and a check valve 34 is disposed therein for providing one way flow from the output tubes 28 and 30 into the mixing chamber 32.

In operation, the sleeve 20 is urged forward ahead of the piston 16 to capture food products or particulate matter within the feeding chamber to thereby define a cylinder bore. The piston 16 is then advanced through the sleeve 20 to create a positive pressure therein, thereby advancing the particulate matter within the sleeve 20 to the output tube 28 and into the mixing chamber 32. At the same time, the sleeve 22 and the piston 18 are retracted from the feeding chamber to cause particulate matter to be drawn into the feeding chamber by suction. Since this is a negative pressure and the particulate matter within the output tube 28 is subjected to positive pressure, the check valve 34 is operable to block off flow through the output tube 30 from the mixing chamber 32. Upon complete reciprocation of the piston 16 within the sleeve 20, the piston 16 is retracted along with the sleeve 20 and the piston 18 and sleeve 22 are advanced forward to the particulate matter into the mixing chamber 32 from the feeding chamber. In this manner, a continuous flow of particulate matter is maintained into the mixing chamber 32 without batching or internal product movement, thereby retaining particle definition and texture for the particulate matter output by the pump 12.

The grinder 14 is comprised of a collection chamber 36, a grinder plate 38, a grinder knife 40 and a variable speed motor 42. The collection chamber 36 is a frustoconical chamber having an inlet port and an outlet port. The inlet port is connected to the mixing chamber 32 and secured thereto with a securing collar 44. The walls of the collection chamber 36 taper outwardly from the inlet port and make an essentially right angle bend to the outlet port to provide an overall expanding chamber therein. The collection chamber 36 is operable to receive the output of the mixing chamber 32 and allow for an expansion of volume before grinding the particulate matter therein to a smaller size.

The grinder plate 38 is disposed adjacent the outlet port of the collection chamber 36 and attached thereto by a securing ring 46. The grinder plate 38 has a plurality of orifices 48 disposed therethrough essentially covering the entire surface thereof. The size of these orifices depends upon the size of the particulate matter in the collection chamber 36 and the pressure applied thereto. Depending upon the type of matter disposed in the collection chamber 36, a decreasing size for the orifices 48 requires an increase in pressure within the collection chamber 36. The size of the orifices 48 are therefore governed by practical considerations of available pressure, particle size and type of material in the collection chamber 36 and the desired particulate size output by the grinder plate 38. Normally the particulate size is reduced prior to feeding it into the pump 12 such that only a moderate amount of pressure is required to force the particulate matter through the grinder plate 38. After a given particulate size is achieved, an operator can clean the system out and change grinder plates 38 to recycle the particulate matter and reduce the size thereof.

Although the chamber 36 is shown attached directly to the mixing chamber 32 with a securing collar 44, it should be understood that a length of tubing can be inserted in between the collection chamber 36 and the mixing chamber 32 such that the grinder plate can be disposed at a remote location. Since the grinder plate 38 presents a pressure drop to any particulate matter passed therethrough, it is preferred that the pressure drop occurs at the receiving end of any processing apparatus rather than at the delivery end. For example, if the pump 12 is located away from a delivery bin (not shown) by a considerable distance, two alternatives are available. First, the grinder plate can be located proximate the pump 12 and an additional length of tubing (not shown) attached to the securing ring 46 for routing the particulate matter to the remote receiving bin. Secondly, the grinder plate 38 and collection chamber 36 can be disposed proximate the receiving bin with the tubing disposed between the chamber 36 and the pump 12. With the second alternative configuration, a much higher pressure is maintained along the length of tubing as compared to the first alternative where there is a pressure drop across the grinder plate 38 wherein the ground particulate matter entering the tubing can be subjected to the backpressure.

The collection chamber 36 has a constricted neck portion 45 at the input end thereof. This neck portion 45 can be relatively long to facilitate removal of the grinder plate 38 and motor 42 to a remote receiving bin. It should be understood also that the neck portion 45 can have an irregular shape that allows for adjustment to different heights and angles.

The grinder knife 40 is comprised of four knife blades 50 that are attached to and extend radially from the end of a rotating drive shaft 52. The drive shaft 52 extends perpendicular to the grinder plate 38 and is rotatable about an axis perpendicular thereto. The drive shaft 52 extends through a bushing 54 in the wall of the collection chamber 36 and connects to the motor 42.

The motor 42 is mounted onto a coupler 56 by an attaching bracket 58. The coupler is attached to a mounting bracket 60 with lugs 62 and 64. The brackets 58 and 60 allow for easy removal of the motor 42 and the coupler 56.

The motor 42 is a high torque low speed hydraulic motor of the type manufactured by HPI-Nichols Model Number 103-7. The hydraulic motor 42 is connected to a hydraulic pump 66 through a hydraulic line 68. By varying the flow of hydraulic fluid to the hydraulic pump 66, the speed of the hydraulic motor 42 can be varied. In the preferred embodiment, the hydraulic motor 42 is connected to the hydraulic unit to the pump 12 through the hydraulic line 68. However, it should be understood that an external hydraulic motor pump can be utilized with the hydraulic motor 42 to provide the rotational movement for the shaft 52 and the grinder knife 40. In processing environments that require the grinder plate to be disposed a distance away from the pump 12, a separate hydraulic pump 66 is preferred.

Although the hydraulic motor is utilized in the preferred embodiment, an electric motor with a gear reduction box can be substituted therefor. A speed control can be utilized with such an electric motor to produce the requisite variable speed capability.

The variable rotation speed of the grinder blade 40 in conjunction with the variable continuous flow supplied by the pump 12 is an important aspect of the present invention. The blades 50 of the grinder blade 40 are operable to traverse the surface of the grinder plate 38 to both clean one side of each of the orifices 48 and to determine the size of the particulate matter. Normally, the particulate matter is meat that is comprised of muscle fiber, fat and gristle and even bone chips. The fibrous material and gristle can be forced through the orifices 48 with a resultant "stringy" material output on the other side of the grinder plate 38. This fibrous material shows a tendency to adhere together to form a particle of meat that is virtually continuous. For many applications, this is undesirable. The rotating knife blades 50 determine the length of the material output from each of the orifices 48 by the relative speed thereof. If a longer length of material is desired on the output of the grinder plate 38, the speed of the blades 50 can be decreased. In addition, the flow rate for the particulate matter entering the collection chamber 36 can also be regulated to regulate the length of the particulate matter output from the orifices in the grinder plate 38. It is the relative rate of the blade rotation and the feed rate into the collection chamber 36 that determines the particulate size.

The rotation of the blades 50, as described above, also provides a cleaning function for the grinder plate 38. For example, when bone chips become lodged in the orifices 48, the rotation of the knife blade 50 thereover functions to dislodge these bone chips to provide maximum throughput for the grinder plate 38. Clogging of these orifices can result in a decrease in the flow rate through the collection chamber 36.

The grinder knife 40 can be disposed on either side of the grinder plate 38 to perform the cutting operation. This would facilitate removal of the grinder knife 40 prior to removal of the grinder plate 38. In addition, it would allow visual inspection of the blades 50 of the cutting knife 40. However, normally the securing ring 46 is attached to a pipe (not shown) for disposing the ground product output from the grinder plate 38 to a remote location.

In summary, there has been provided a variable speed meat grinder that utilizes a pump to provide a continuous flow of meat product at a relatively high pressure of up to around 3,000 psi. The meat is passed into a frusto-conical shaped collection chamber and to a grinder plate for reduction of size by passing the meat product through orifices disposed through the grinder plate. A variable speed cutting knife is rotated over the surface of the grinding plate within the collection chamber to define the length of the particles output by each of the orifices in the grinder plate. By varying the speed of the cutting knife and the flow rate of the meat particles through the collection chamber, the particle size can be changed for a given grinder plate. With a high pressure continuous flow pump, it is also possible to dispose the grinder plate and the cutting knife at a distance away from the pump itself. This is not possible with any of the grinders found in the prior art.

Although the preferred embodiment has been described in detail, it should be understood that various changes, substitutions and alterations can be made therein without departing from the spirit and scope of the invention as defined by the appended claims.

What is claimed is:

1. An apparatus for grinding meat particles, comprising:

a pump having a variable feed rate for feeding meat particles in a continuous flow under high pressure and at a selected feed rate that remains constant throughout the pumping operation;

a frusto-conical collection chamber having a right angle bend in the middle thereof with an inlet port disposed adjacent said pump for receiving the output of said pump into the interior of said chamber and an outlet port disposed at right angles to said inlet port at the other end of said chamber, the diameter of said outlet port larger than that of said inlet port such that an expanding volume is provided for meat particles pumped from said pump;

a grinder plate disposed over said outlet port of said collection chamber with a plurality of orifices disposed therein for reducing the particulate size of the meat particles as the meat particles are pressed therethrough from said collection chamber by said pump;

a plurality of planar cutting blades rotatable about an axis perpendicular to said grinder plate and extending radially therefrom, said blades rotating in a plane parallel to said grinder plate such that said blade moves perpendicular to the orifices in said grinder plate to reduce the length of the meat particles output from said grinder plate;

a rotating shaft disposed along the rotational axis of said blades and attached at one end to the rotational center of said blades, said rotating shaft passing through said collection chamber to the exterior thereof; and a variable speed hydraulic motor attached to the other end of said rotating shaft for rotation thereof to thus control the rotational speed of said blades such that the length of the meat particles output from said grinder plate is varied to a desired particulate length, said hydraulic motor powered by a hydraulic pump.

2. The apparatus of claim 1 wherein said cutting blades are disposed on the side of said grinder plate nearestmost the interior of said collection chamber.

3. The apparatus of claim 1 wherein said collection chamber has a constricted neck portion adjacent the inlet port thereof, said neck portion having a length sufficient to allow disposal of the outlet port of said chamber, said grinder plate and said motor at a remote point from said pump.

* * * * *